(12) United States Patent
Herrell et al.

(10) Patent No.: US 7,600,082 B2
(45) Date of Patent: Oct. 6, 2009

(54) VIRTUALIZATION LOGIC

(75) Inventors: Russ Herrell, Fort Collins, CO (US);
Gerald J. Kaufman, Jr., Fort Collins, CO (US); John A. Morrison, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 674 days.

(21) Appl. No.: 11/000,279

(22) Filed: Nov. 30, 2004

(65) Prior Publication Data

US 2006/0129743 A1 Jun. 15, 2006

(51) Int. Cl.
*G06F 13/14* (2006.01)

(52) U.S. Cl. .................. 711/154; 711/100; 711/163; 711/200; 711/203

(58) Field of Classification Search .............. 711/154, 711/100, 163, 200, 203
See application file for complete search history.

(56) References Cited

U.S. PATENT DOCUMENTS

| 6,401,191 | B1 * | 6/2002 | Jones ........................ 712/38 |
| 6,442,656 | B1 * | 8/2002 | Alasti et al. .................. 711/154 |
| 6,629,157 | B1 * | 9/2003 | Falardeau et al. ............. 710/10 |
| 6,766,519 | B1 * | 7/2004 | Burriss et al. ................ 719/321 |
| 6,993,032 | B1 * | 1/2006 | Dammann et al. ........ 370/395.7 |
| 2003/0229802 | A1 * | 12/2003 | Challener et al. ........... 713/200 |
| 2004/0193822 | A1 * | 9/2004 | Kareenahalli et al. ....... 711/167 |
| 2005/0204093 | A1 * | 9/2005 | Rotithor et al. ............. 711/105 |

* cited by examiner

*Primary Examiner*—Tuan V Thai
*Assistant Examiner*—Yong Choe

(57) ABSTRACT

Systems, methodologies, media, and other embodiments associated with externally trapping transactions are described. One exemplary system embodiment includes an external virtualization logic configured to be operably connected to a processor that does not include internal virtualization support. The example system may include a data store for storing a trappable memory address and a transaction that causes the external virtualization logic to produce a trap.

23 Claims, 10 Drawing Sheets

VIRTUALIZATION LOGIC

BACKGROUND

Computer hardware devices are generally considered to be tangible, physical things. These physical devices often include registers to and/or from which information (e.g., data, control, configuration) can be read and/or written. Registers may be mapped to memory addresses to facilitate device access. For example, the address 0x3f8 is often mapped to a read/write port on an input/output (I/O) card. Thus, a central processing unit (CPU) or other processor may interact with various computer hardware devices through memory addresses that are mapped to a physical device register. However, computer hardware devices may also be virtualized. Thus, operating systems, applications, and so on, may also interact with virtual devices rather than physical devices. For example, a personal computer may interact with a "disk drive" that is implemented in RAM (Random Access Memory). Like a physical device, the virtual device may also include a set of registers through which data and/or control information can be read and/or written. Thus, a virtual device may also be addressed using, for example, a memory mapped I/O scheme.

A virtual device may be provided, for example, by software, by other hardware devices, by combinations thereof, and so on. When virtualized by software, the virtual device may be implemented on various processors. However, conventionally a performance penalty may be associated with software based virtualization, even when a virtual device is not being accessed. When a device is virtualized in other hardware, the performance penalty associated with software virtualization may be reduced. However, conventional hardware supported virtualization may require a processor to be designed with hardware virtualization support functions, which may increase chip cost, development time, and so on. Also, hardware supported virtualization conventionally requires a processor designer to anticipate interacting with virtualization hardware and to correctly forecast required support functions. Additionally, when hardware supported virtualization is implemented but not employed, the circuitry that implements the built-in virtualization support functions may remain as power-consuming, heat-generating surplus. Furthermore, hardware supported virtualization typically requires complete CPU virtualization, which limits a virtualization scheme to a single level of virtualization privilege. Nevertheless, virtualization may facilitate proto-typing devices, may facilitate testing, may remove certain physical barriers from computing systems, may facilitate partitioning hardware functions among multiple operating systems and applications, and so on.

BRIEF DESCRIPTION OF THE DRAWINGS

The accompanying drawings, which are incorporated in and constitute a part of the specification, illustrate various example systems, methods, and so on, that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Figure 1:
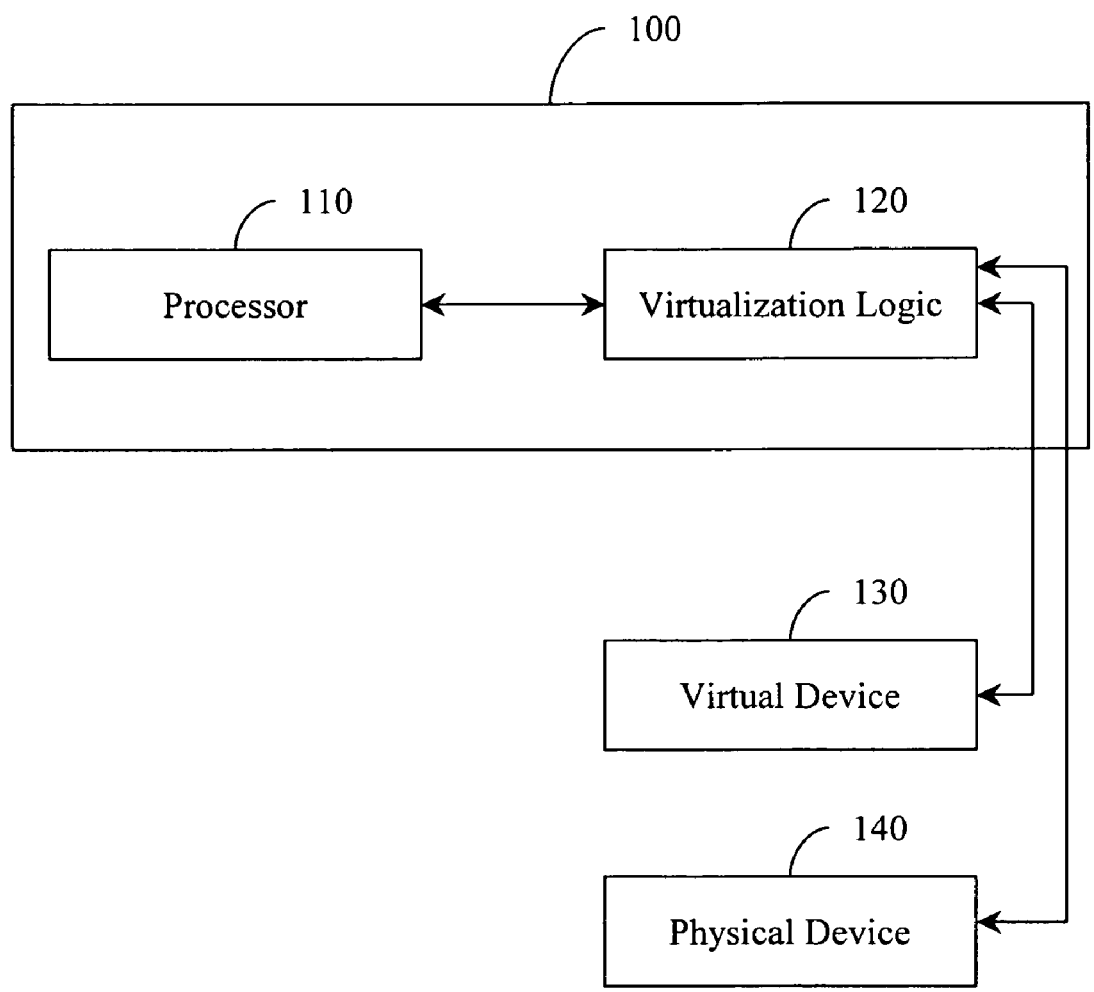
FIG. 1 illustrates an example virtualization logic for supporting hardware based off-chip virtualization via an external address trap.

Example systems and methods described herein concern associating external virtualization hardware with processors that may not have been designed to support virtualization. For example, a processor may not have been designed with internal hardware and/or software support for interacting with virtual input/output (I/O) devices. By employing external virtualization hardware as described herein, a processor may be able to interact with virtual devices like I/O devices without incurring the performance penalty associated with conventional software based virtualization and without requiring the processor design to include complete CPU virtualization.

The following includes definitions of selected terms employed herein. The definitions include various examples and/or forms of components that fall within the scope of a term and that may be used for implementation. The examples are not intended to be limiting. Both singular and plural forms of terms may be within the definitions.

As used in this application, the term "computer component" refers to a computer-related entity, either hardware, firmware, software, a combination thereof, or software in execution. For example, a computer component can be, but is not limited to being, a process running on a processor, a processor, an object, an executable, a thread of execution, a program, and a computer. By way of illustration, both an application running on a server and the server can be computer components. One or more computer components can reside within a process and/or thread of execution and a computer component can be localized on one computer and/or distributed between two or more computers.

"Computer-readable medium". as used herein, refers to a medium that participates in directly or indirectly providing instructions and/or data. A computer-readable medium may take forms, including, but not limited to, non-volatile media, and volatile media. Non-volatile media may include, for example, optical or magnetic disks, and so on. Volatile media may include, for example, optical or magnetic disks, dynamic memory and its like. Common forms of a computer-readable medium include, but are not limited to, a floppy disk, a flexible disk, a hard disk, a magnetic tape, other magnetic media, a CD-ROM, other optical media, punch cards, paper tape, other physical media with patterns of holes, a RAM, a ROM, an EPROM, a FLASH-EPROM, or other memory chip or card, a memory stick, and other media from which a computer, a processor or other electronic device can read.

"Data store", as used herein, refers to a physical and/or logical entity that can store data. A data store may be, for example, a table, a file, a list, a queue, a heap, a memory, a register, and so on. A data store may reside in one logical and/or physical entity and/or may be distributed between two or more logical and/or physical entities.

"Logic", as used herein, includes but is not limited to hardware, firmware, and/or combinations of each to perform a function(s) or an action(s), and/or to cause a function or action from another logic, method, and/or system. For example, based on a desired application or needs, logic may include discrete logic like an application specific integrated circuit (ASIC), a programmed logic device, a memory device containing instructions, or the like. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. Typically, an operable connection includes a physical interface, an electrical interface, and/or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical and/or physical communication channels can be used to create an operable connection.

"Signal", as used herein, includes but is not limited to one or more electrical or optical signals, analog or digital signals, data, one or more computer or processor instructions, messages, a bit or bit stream, or other means that can be received, transmitted and/or detected and that may facilitate transferring information.

"Software", as used herein, includes but is not limited to, one or more computer or processor instructions that can be read, interpreted, compiled, and/or executed and that cause a computer, processor, or other electronic device to perform functions, actions and/or behave in a desired manner. The instructions may be embodied in various forms like routines, algorithms, modules, methods, threads, and/or programs including separate applications or code from dynamically and/or statically linked libraries. Software may also be implemented in a variety of executable and/or loadable forms including, but not limited to, a stand-alone program, a function call (local and/or remote), a servelet, an applet, instructions stored in a memory, part of an operating system or other types of executable instructions. It will be appreciated by one of ordinary skill in the art that the form of software may depend, for example, on requirements of a desired application, the environment in which it runs, and/or the desires of a designer/programmer or the like. It will also be appreciated that computer-readable and/or executable instructions can be located in one logic and/or distributed between two or more communicating, co-operating, and/or parallel processing logics and thus can be loaded and/or executed in serial, parallel, massively parallel and other manners.

Suitable software for implementing the various components of the example systems and methods deserted herein may be produced using programming languages and tools like Java, Pascal, C#, C++, C, CGI, Perl, SQL, APIs, SDKs, assembly, firmware, microcode, and/or other languages and tools. Software, whether an entire system or a component of a system, may be embodied as an article of manufacture end maintained or provided as part of a computer-readable medium as defined previously.

As used herein, the term "trap" includes an unprogrammed conditional action performed automatically by hardware and/or firmware. A trap may occur when an exceptional event causes automatic transfer to a special routine for handling that event.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like.

It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. Unless specifically stated otherwise, it is appreciated that throughout the description, terms like processing, computing, calculating, determining, displaying, or the like, refer to actions and processes of a computer system, logic, processor, or similar electronic device that manipulates and transforms data represented as physical (electronic) quantities.

FIG. 1 illustrates an example virtualization logic 120 supporting off-chip virtualization in a system 100 via external address trapping. External, as used herein, means logically and physically distinct from. For example, two integrated circuits that may be operably connected may be said to be external to each other. When they are operably connected, they remain external to each other. However, a functional unit located inside a processor (e.g., a floating point unit) is not, as the term is employed herein, external to the processor.

System 100 includes a processor 110 that was not designed with virtualization capability. Thus, standing alone, processor 110 would not be able to interact with a virtual device. In one example, processor 110 may be a links-based processor with multiple links and multiple cores. In another example, processor 110 may be a bus-based processor or single core processor. In one example, processor 110 may be configured to process a transaction like a management to processor transaction (MPT), and the like. One example MPT may be a platform management interrupt (PMI) transaction like those associated with various Intel processor architectures. An MPT may, for example, facilitate linking a processor with a system memory, primary input/output bus bridge, system fabric, and so on. In another example, processor 110 may be configured to process interrupts like a non-maskable interrupt (NMI), which may be provided by a transaction, by a physical pin, and so on. Processor 110 may have available a "secure mode". The secure mode may be employed, for example, in multi-partition systems. The secure mode may include providing an address range that is only accessible when the processor 110 is in secure mode. The ability to transition processor 110 into and/or out of secure mode may be limited to privileged instructions. For example, operating system code and application code may not be able to control secure mode transitions while boot firmware code may be able to control secure mode transitions.

System 100 also includes a virtualization logic 120 that is located external to processor 110. Virtualization logic 120 is not circuitry that is part of processor 110. Virtualization logic 120 is a separate component like an integrated circuit that can be operably connected to processor 110. In system 100, virtualization logic 120 has been operably connected to processor 110. Additionally, virtualization logic 120 has been positioned between processor 110 and a virtual device 130. Similarly, virtualization logic 120 has been positioned between processor 110 and physical device 140. Thus, virtualization logic 120 has been positioned to facilitate intercepting transactions like input/output requests, memory transactions, and so on, from the processor 110.

Processor 110 may be a processor that produces memory transactions but which may not include internal virtualization logic. Thus, processor 110 may be configured to interact with physical device 140 but may not initially be configured to interact with virtual device 130. Therefore, virtualization logic 120 may intercept memory transactions from processor 110 to facilitate providing external virtualization support for processor 110. For example, virtualization logic 120 may selectively route transactions based, for example, on an address range associated with virtual device 130. Additionally, virtualization logic 120 may provide a signal (e.g., MPT) to processor 110 to facilitate processor 110 invoking code (e.g., virtual device driver) for interacting with virtual device 130.

Figure 2:
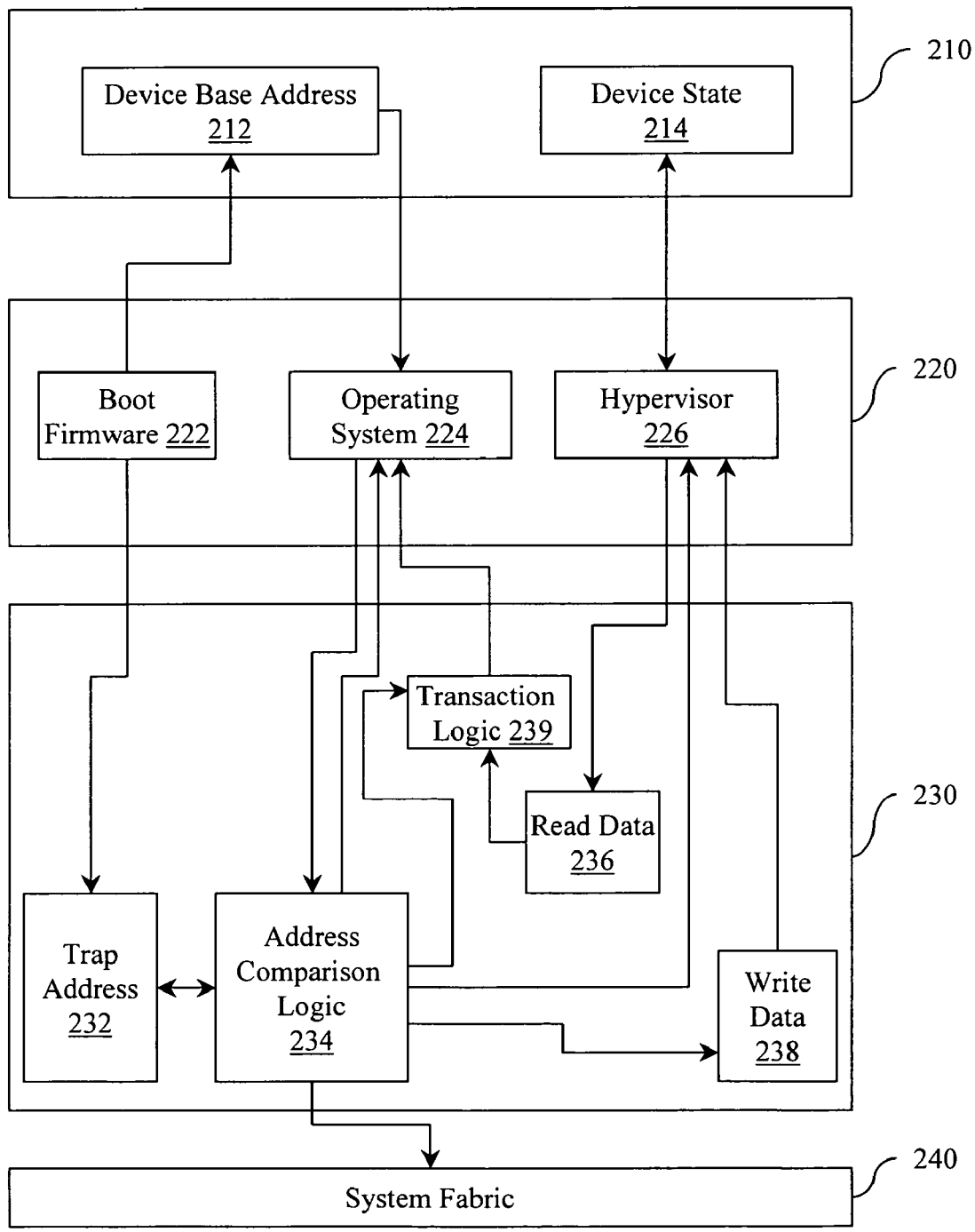
FIG. 2 illustrates an example virtualization logic.

FIG. 2 illustrates an example virtualization logic 230 that is configured to be operably connected to a processor 220. Processor 220 is configured to produce a memory transaction but is not configured with internal virtualization logic. Processor 220 may be associated with a boot firmware 222 that is configured to inform, for example, an operating system 224 and/or a system memory 210 about devices and their address ranges. In some examples, the boot firmware 222 may employ standard techniques like those associated with ACPI (Advanced Configuration and Power Interface) to communicate with computer components (e.g., operating system 224, device base address data store 212). In different examples, the address range associated with a virtual device may be, for example, a contiguous range, multiple disjoint regions, and so on.

Processor 220 may be associated with an operating system 224 and a hypervisor 226. The operating system 224 may control user resources and various physical resources associated with processor 220. Hypervisor 226 may provide and manage virtual machines, virtual devices, and so on. For example, hypervisor 226 may create virtual devices and present them to operating system 224. Information concerning various virtual devices may be stored, for example, in a device state data store 214 in system memory 210. Similarly, information about virtual devices and their address ranges may be stored in a device base address data store 212 in system memory 210.

Virtualization logic 230 is external to processor 220. For example, in a cellular architecture virtualization logic 230 may be located in a cell controller. Virtualization logic 230 may include a data store 232 that is configured to store a trappable memory address. As described above, the trappable memory address may be associated with a virtual device(s) and may be provided by boot firmware 222. In one example, the trappable memory address may be associated with a virtual input/output device. While a virtual input/output device is described, it is to be appreciated that other virtual devices (e.g., RAM disk) may be employed. Virtualization logic 230 may be configured to produce a trap when a memory transaction references an address in the address range(s) stored in data store 232.

Virtualization logic 230 may also include an address comparison logic 234 that is configured to receive a memory transaction from processor 220 and to selectively produce a trap when the memory transaction references the trappable memory address. For example, when a memory transaction with an address in the trappable memory address range is encountered, the virtualization hardware 230 may produce a trap. In one example, producing the trap may include generating an MPT transaction and providing it to processor 220. In another example, producing the trap may include generating an NMI in processor 220. The virtualization logic 230 may receive, for example, read and/or write requests from operating system 224. Thus, address comparison logic 234 may be configured to provide a read defer response to processor 220 and/or operating system 224 in response to receiving a memory read transaction. Similarly, the address comparison logic 234 may be configured to provide a posted response to processor 220 and/or operating system 224 in response to receiving a memory write transaction. While read defer responses and write posted responses are described, it is to be appreciated that other responses tailored to satisfy the demands of various processors and/or operating systems may be provided by the virtualization logic 230.

Virtualization logic 230 may also include a data store 236 that is configured to store data associated with a memory read transaction for which the address comparison logic 234 produced a trap. In one example, data store 236 may be a queue that facilitates maintaining a desired order for transactions. Storing memory read transactions may facilitate the virtualization hardware 230 providing a read defer response to processor 220. When a virtual device driver executes, it may be able to access read memory transactions and/or related data stored in data store 236 and perform them in order. Similarly, virtualization logic 230 may include a data store 238 that is configured to store data associated with a memory write transaction for which the address comparison logic 234 produced a trap. In one example, data store 238 may be a queue that facilitates maintaining a desired order for transactions. While a queue is described as an example for data stores 236 and 238, it is to be appreciated that other data stores that facilitate maintaining transaction order may be employed.

Virtualization logic 230 may also include a transaction logic 239 that is configured to selectively provide a signal to processor 220 in response to the address comparison logic 234 producing a trap. As described above, the signal may be, for example, an MPT, an NMI, and so on. Thus, the transaction logic 239 may facilitate controlling the processor 220 to invoke a virtual device driver to handle a memory request whose address falls within the trappable address range stored in data store 232.

Since the virtualization logic 230 may provide signals like MPTs and NMIs to processor 220, processor 220 may be configured to call a handler process in response to receiving a signal from the virtualization logic 230. The handler process may be configured to execute, in order, memory transactions stored in data store 236 and/or data store 238. In one example, processor 220 may be controlled to enter or leave a secure state, where a protected address range (e.g., addresses associated with a virtual device) may only be accessed by processor 220 when processor 220 is in the secure state. For example, processor 220 may be controlled to enter the secure state in response to receiving an MPT or an NMI. In one example, a register associated with controlling and/or configuring virtualization logic 230 may be located in virtualization logic 230 and have an address in an address range protected by the secure state. Thus, the virtualization logic 230 may, in some examples, be configured by code executing while the processor 220 is in the secure state.

FIG. 2 also illustrates a system fabric 240. System fabric 240 may be, for example, a uniform inter-node communication medium that connects processors, input/output devices, bus interfaces, and so on. While the virtualization logic 230 may produce a signal that causes some intercepted transactions to be stored in virtualization logic 230 and processed by a virtual device driver, other transactions may not produce a trap, and thus may be forwarded from the virtualization logic 230 to the system fabric 240 for conventional processing. Thus, virtualization logic 230 may facilitate providing virtualization support to processor 220 without much of the overhead and delays associated with conventional virtualization support systems.

As can be appreciated by one skilled in the art, certain examples associated with FIG. 2 (e.g., MPT, cellular architecture, cell controller) may include certain elements that are specific to certain architectures like the Itanium architecture. Thus, FIG. 3 illustrates another more generic virtualization logic 330.

Figure 3:
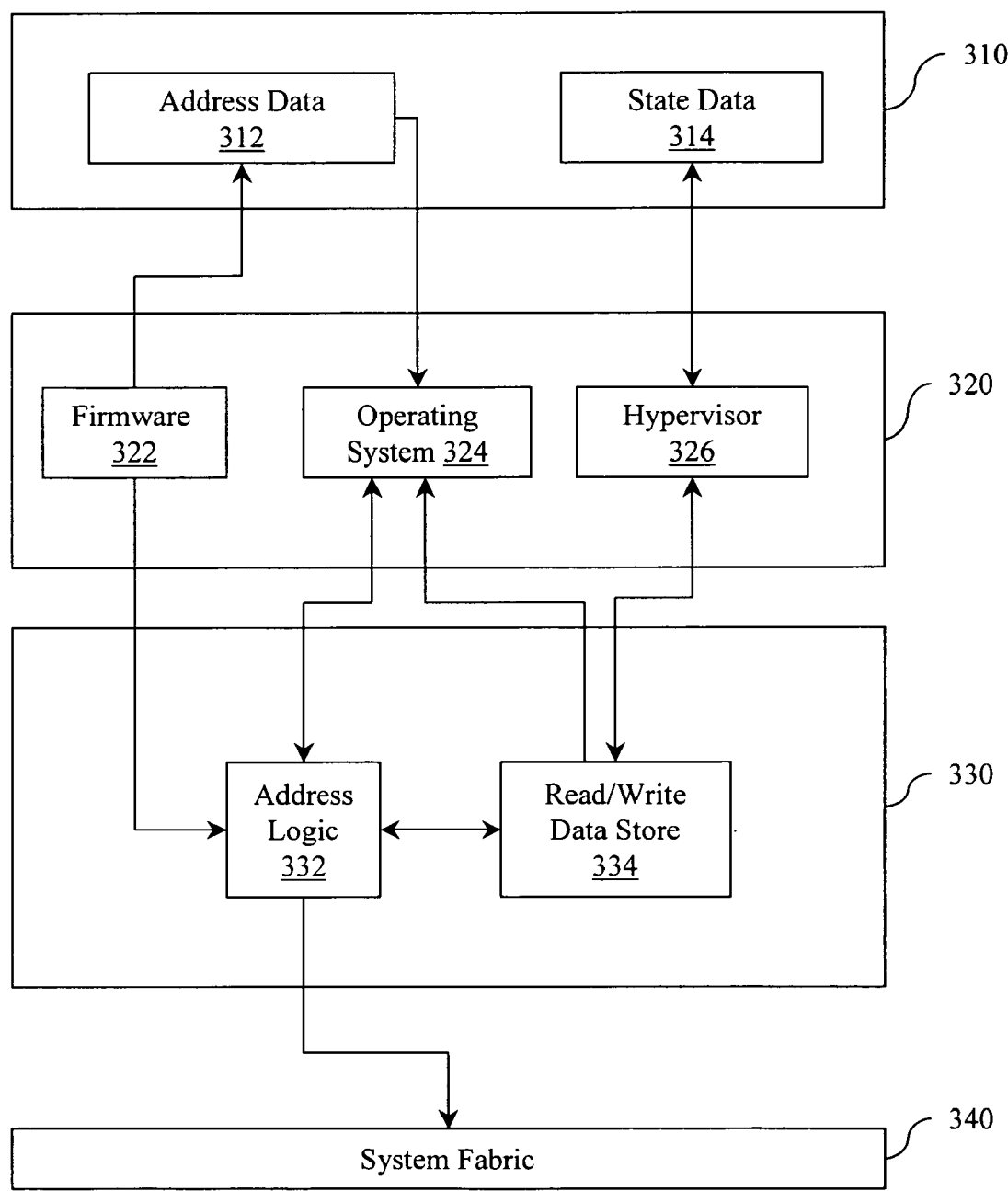
FIG. 3 illustrates another example virtualization logic.

FIG. 3 illustrates a system memory 310 in which data associated with virtual devices for which external virtualization support is provided may be stored. For example, address data may be stored in an address data store 312. Similarly, a state data store 314 may store state data associated with virtual devices for which external virtualization support is provided. While system memory 310 is illustrated external to processor 320, it is to be appreciated that in some examples system memory 310 may be internal to processor 320.

Processor 320 is associated with a firmware 322, and runs an operating system 324 and a hypervisor 326. The hypervisor 326 may present a virtual copy of an underlying hardware resource that it controls to the operating system(s) 324 being run by processor 320. At, or after boot time, the firmware 322 may place a virtualized device within an address range and configure an "interception hardware" like virtualization logic 330 to intercept memory accessing transactions for that address range.

The virtualization logic 330 may include an address logic 332 and a read/write data store 334. The address logic 332 may be configured to intercept memory accessing transactions when they leave the processor 320 and before they arrive at an intended destination (e.g., a location in system fabric 340, a virtual device). The virtualization logic 330 may be located, for example, in a cell controller in a cellular architecture. The address logic 332 may examine a physical address associated with the memory accessing transaction. If the address is in a virtualization range, then the address logic 332 may store data associated with the transaction and provide a signal (e.g., MPT, NMI) to the source of the intercepted transaction (e.g., processor 320). Otherwise, the address logic 332 may allow the transaction to flow through virtualization logic 330 to system fabric 340 to be handled normally.

Since several memory accessing transactions (e.g., reads, writes) may be issued before a handler is executed by processor 320, the virtualization logic 330 may store data associated with the reads and/or writes in data store 334. In one example, the actual read and write transactions may be stored in data store 334. Data store 334 may be configured to be large enough to store a maximum number of writes that may occur between transaction interception and the execution of the handler by processor 320. Additionally, data store 334 may be configured to facilitate maintaining the order of transactions.

To prevent processor 320 from stalling on the intercepted transaction, the virtualization logic 330 may acknowledge the transaction. For example, the virtualization logic 330 may produce a read defer response in response to intercepting a read transaction. Similarly, the virtualization logic 330 may produce a posted response in response to intercepting a write transaction.

Figure 4:
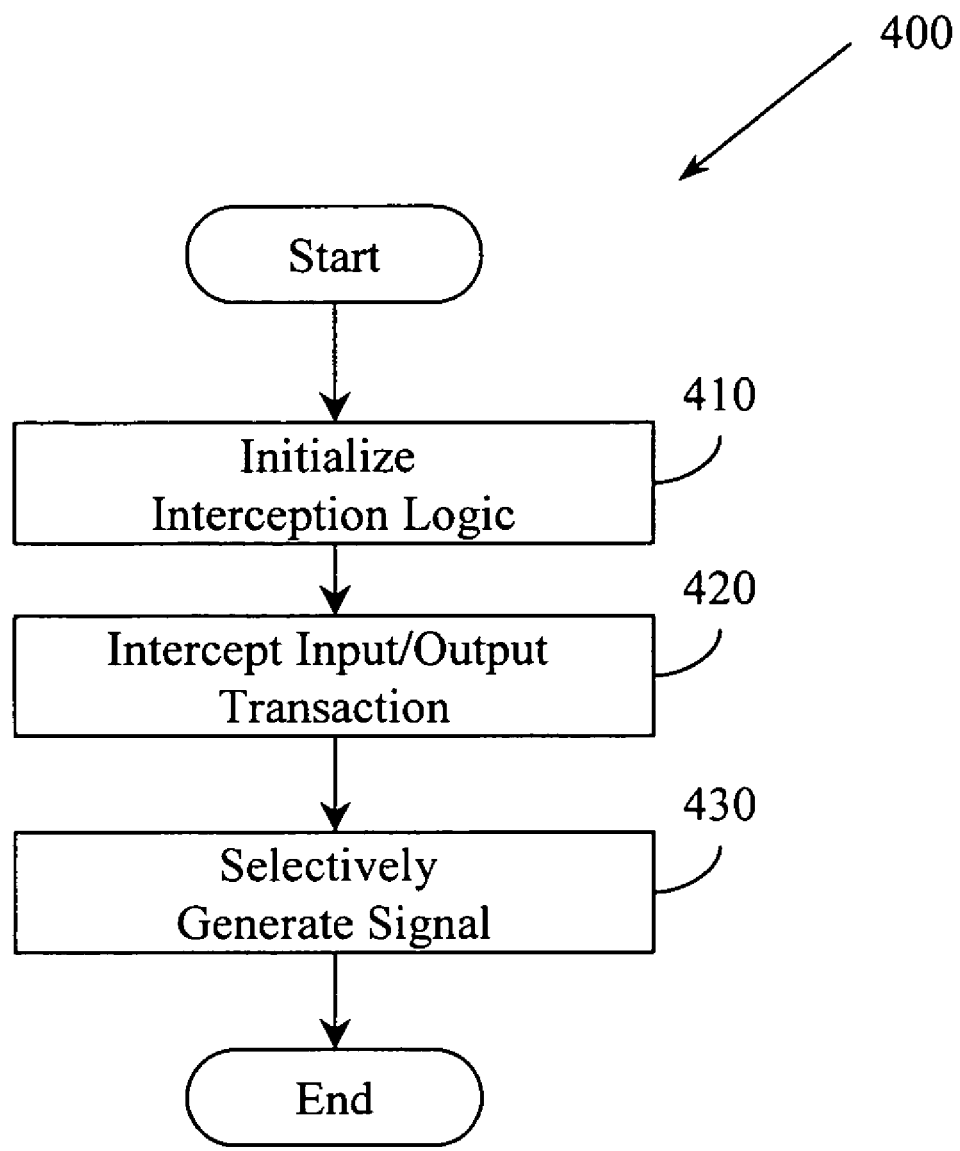
FIG. 4 illustrates an example method for supporting hardware based off-chip virtualization via external address trapping.
Figure 5:
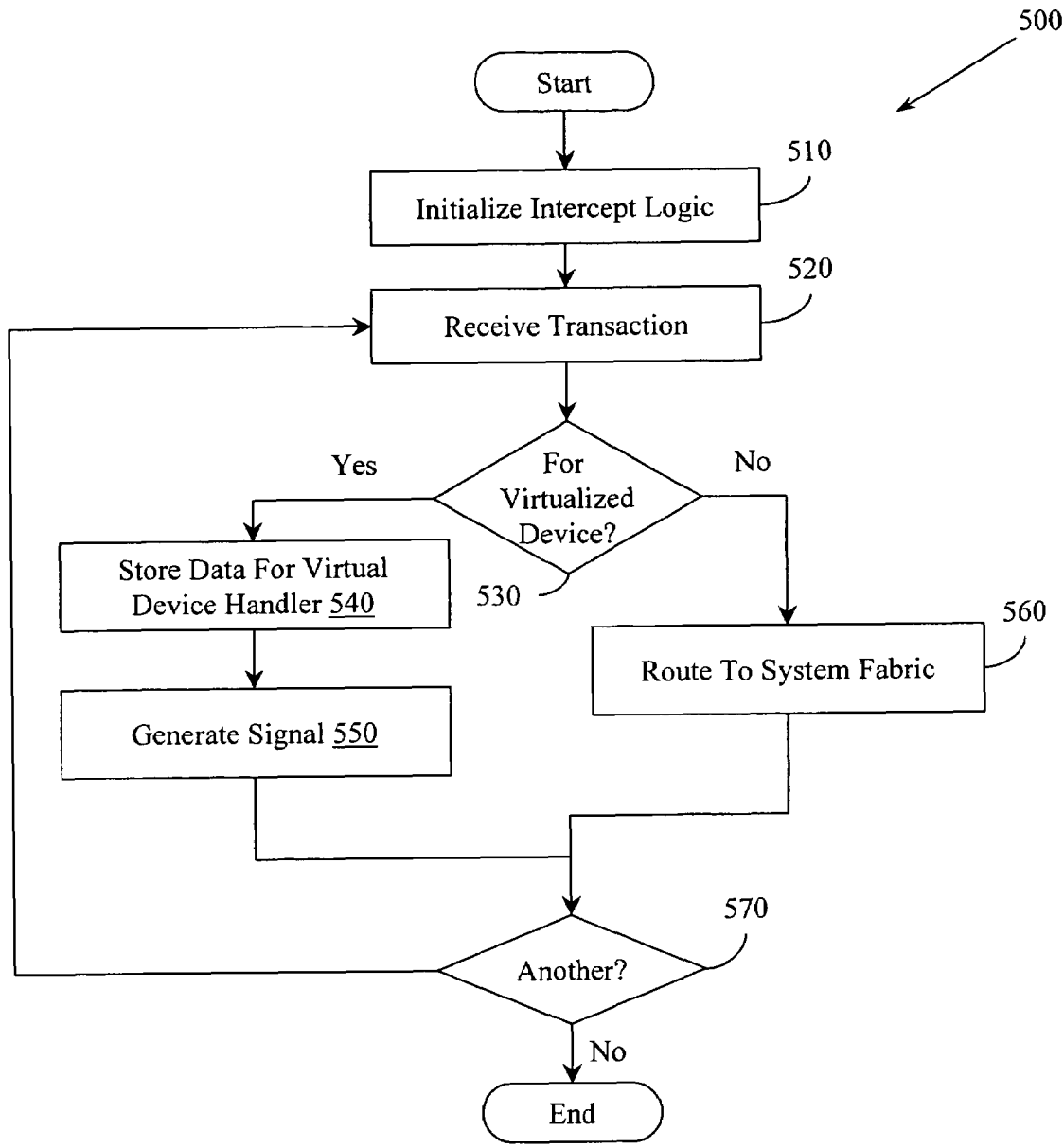
FIG. 5 illustrates another example method for supporting hardware based off-chip virtualization via external address trapping.

Example methods may be better appreciated with reference to the flow diagrams of FIGS. 4 and 5. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Furthermore, additional and/or alternative methodologies can employ additional, not illustrated blocks.

In the flow diagrams, blocks denote "processing blocks" that may be implemented with logic. The processing blocks may represent a method step and/or an apparatus element for performing the method step. A flow diagram does not depict syntax for any particular programming language, methodology, or style (e.g., procedural, object-oriented). Rather, a flow diagram illustrates functional information one skilled in the art may employ to develop logic to perform the illustrated processing. It will be appreciated that in some examples, program elements like temporary variables, routine loops, and so on, are not shown. It will be further appreciated that electronic and software applications may involve dynamic and flexible processes so that the illustrated blocks can be performed in other sequences that are different from those shown and/or that blocks may be combined or separated into multiple components. It will be appreciated that the processes may be implemented using various programming approaches like machine language, procedural, object oriented and/or artificial intelligence techniques.

FIG. 4 illustrates an example method 400 for supporting hardware based off-chip virtualization via external address trapping. Method 400 includes, at 410, initializing an interception logic that is configured to be operably connected to a processor that does not include internal virtualization support. In one example, initializing the interception logic may include providing an address associated with a virtual device to the interception logic. The interception logic may include hardware registers whose addresses are located in a secure address range. Thus, the interception logic registers may only be available to trusted virtualization software and not to an operating system and/or application level code.

Method 400 also includes, at 420, intercepting an input/output request produced by the processor. The intercepting occurs after the input/output request leaves the processor and before the input/output request arrives at an intended destination. In one example, intercepting an input/output request may include receiving the input/output request, examining an address associated with the input/output request, and selectively routing the input/output request based, at least in part, on the address associated with the input/output request. For example, input/output requests associated with a virtual device may be stored in a data store while input/output requests associated with a physical device may be provided to the physical device. In one example, intercepting an input/ output transaction may also include storing the input/output request in a location accessible to a device driver associated with a virtual device.

Method 400 also includes, at 430, selectively generating and providing a signal to the processor. Whether a signal is generated and provided depends, at least in part, on whether the intended destination is a virtual device. In one example, selectively generating and providing a signal to the processor may include producing an MPT. In another example, selectively generating and providing a signal to the processor includes producing a non-maskable interrupt (NMI). In the MPT example, the MPT will invoke virtualization software and set a processor into secure mode. The virtualization software may then access stored transactions and execute them in order.

In one example, method 400 may require a processor that produces intercepted transactions to satisfy two constraints. First, that an MPT will be taken while there is a pending read. Second, that memory mapped input/output is strongly ordered so that a pending read will block subsequent reads and writes until the read is satisfied.

In addition to producing a signal, method 400 may also include responding to intercepted transactions. For example, intercepting an input/output transaction may include providing a response (e.g., read defer) to a read request from the processor. Similarly, intercepting an input/output transaction may include providing a response (e.g., write posted) to a write request from the processor. It is to be appreciated that different processors, operating systems, and transactions may lead to different responses being provided by method 400.

While FIG. 4 illustrates various actions occurring in serial, it is to be appreciated that various actions illustrated in FIG. 4 could occur substantially in parallel. By way of illustration, a first process could initialize an interception logic. Similarly, a second process could intercept input/output transactions while a third process could selectively generate signals. While three processes are described, it is to be appreciated that a greater and/or lesser number of processes could be employed and that lightweight processes, regular processes, threads, and other approaches could be employed. It is to be appreciated that other example methods may, in some cases, also include actions that occur substantially in parallel.

FIG. 5 illustrates a method 500 for supporting hardware based off-chip virtualization via external address trapping. Method 500 includes, at 510, initializing an interception logic. Initializing an interception logic may include, for example, writing a value(s) to a register in the interception logic, establishing an address range for which the interception logic is to produce a trap, establishing a transaction type for which the interception logic is to produce a trap, and so on. Method 500 may also include, at 520, receiving a transaction. The transaction may be, for example, a memory accessing transaction, an input/output transaction, and/or other transactions. At 530 a determination is made concerning whether the transaction is intended for a virtualized device. The determination may be based, at least in part, on the address range and/or transaction type established at 510. If the determination at 530 is No, then at 560 the transaction may be routed to a destination like a system fabric. But if the determination at 530 is Yes, then at 540 data associated with the transaction may be stored for subsequent processing by a virtual device handler. Then, at 550, a signal may be generated and provided to the transaction producer. At 570, a determination may be made concerning whether another transaction is to be processed. If the determination is No, then processing may conclude. Otherwise, processing may return to 520.

In one example, methodologies may be implemented as processor executable instructions and/or operations provided on a computer-readable medium. Thus, in one example, a computer-readable medium may store processor executable instructions operable to perform a method that includes initializing an interception logic that is configured to be operably connected to a processor that does not include internal virtualization support. Initializing the interception logic may include providing an address associated with a virtual device to the interception logic. The method may also include intercepting a transaction (e.g., input/output request) produced by the processor. The intercepting may occur after the input/output request leaves the processor and before the input/output request arrives at an intended destination. Intercepting an input/output request may include receiving the input/output request, examining an address associated with the input/output request, and selectively routing the input/output request based, at least in part, on the address associated with the input/output request. The method may also include storing the input/output request in a location accessible to a device driver associated with the virtual device. The method may also include selectively producing an MPT based, at least in part, on whether the intended destination is a virtual device. The method may also include notification of termination of the transaction to a requestor whose transaction was interrupted. While the above method is described being provided on a computer-readable medium, it is to be appreciated that other example methods described herein can also be provided on a computer-readable medium.

Figure 6:
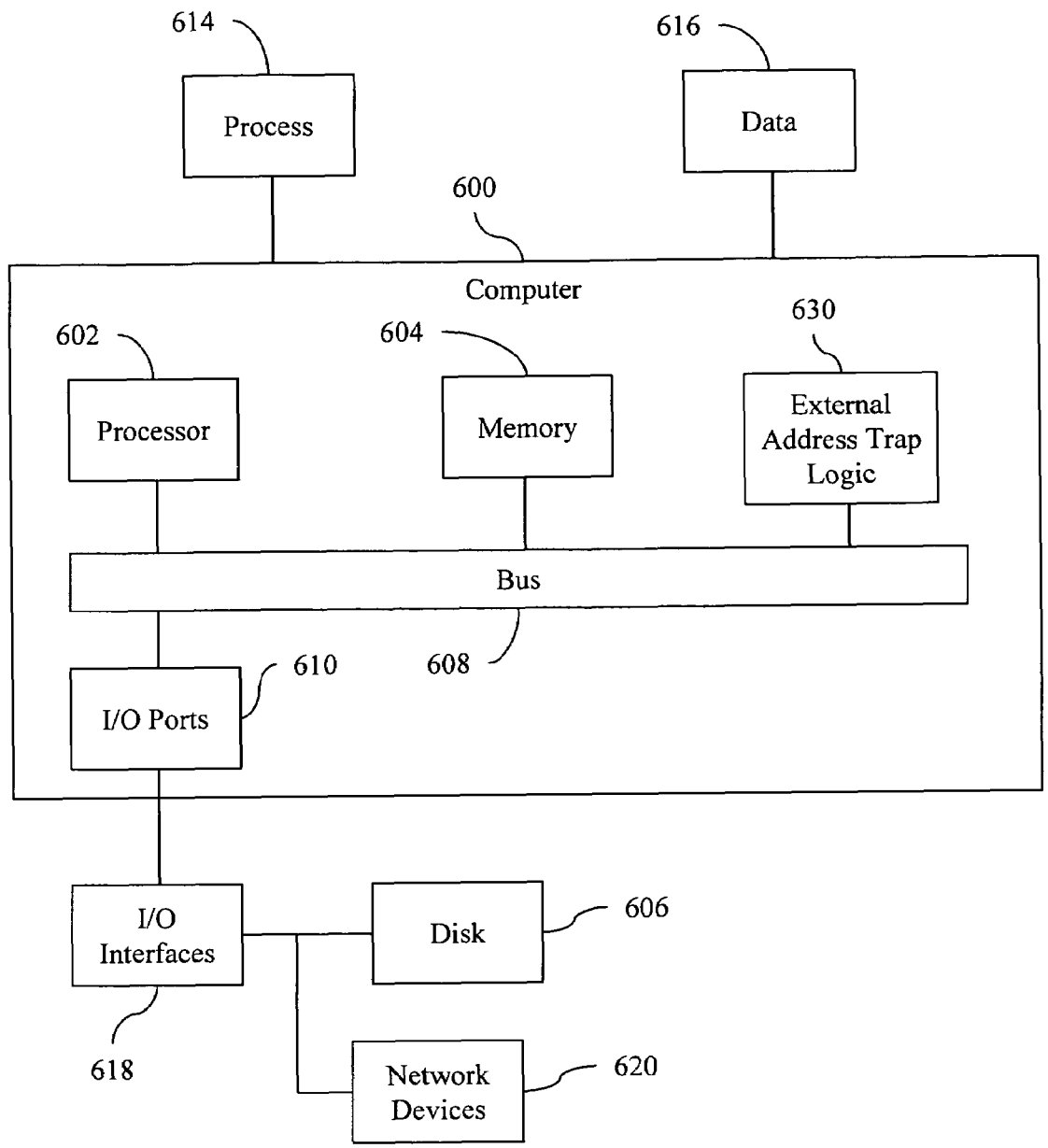
FIG. 6 illustrates an example computing environment in which example systems and methods illustrated herein may operate.

FIG. 6 illustrates a computer 600 that includes a processor 602, a memory 604, and input/output ports 610 operably connected by a bus 608. In one example, the computer 600 may include an external address trap logic 630 configured to facilitate providing virtualization for processor 602 when processor 602 does not have internal virtualization support. Thus, the external address trap logic 630, whether implemented in computer 600 as hardware or hardware and firmware may provide means for accessing a memory transaction produced by a processor that does not include an internal virtualization logic. The external address trap logic 630 may also provide means for determining whether the memory transaction is intended for a virtual device and means for signaling the processor 602 to invoke a device driver to process the memory transaction for the virtual device.

The processor 602 can be a variety of various processors including dual microprocessor and other multi-processor architectures. The memory 604 can include volatile memory and/or non-volatile memory. The non-volatile memory can include, but is not limited to, ROM, PROM, EPROM, EEPROM, and the like. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 606 may be operably connected to the computer 600 via, for example, an input/output interface (e.g., card, device) 618 and an input/output port 610. The disk 606 can include, but is not limited to, devices like a magnetic disk drive, a solid state disk drive, a floppy disk drive, a tape drive, a Zip drive, a flash memory card, and/or a memory stick. Furthermore, the disk 606 can include optical drives like a CD-ROM, a CD recordable drive (CD-R drive), a CD rewriteable drive (CD-RW drive), and/or a digital video ROM drive (DVD ROM). The memory 604 can store processes 614 and/or data 616, for example. The disk 606 and/or memory 604 can store an operating system that controls and allocates resources of the computer 600.

The bus 608 can be a single internal bus interconnect architecture and/or other bus or mesh architectures. While a single bus is illustrated, it is to be appreciated that computer 600 may communicate with various devices, logics, and peripherals using other busses that are not illustrated (e.g., PCIE, SATA, Infiniband, 1394, USB, Ethernet). The bus 608 can be of a variety of types including, but not limited to, a memory bus or memory controller, a peripheral bus or external bus, a crossbar switch, and/or a local bus. The local bus can be of varieties including, but not limited to, an industrial standard architecture (ISA) bus, a microchannel architecture (MSA) bus, an extended ISA (EISA) bus, a peripheral component interconnect (PCI) bus, a universal serial (USB) bus, and a small computer systems interface (SCSI) bus.

The computer 600 may interact with input/output devices via i/o interfaces 618 and input/output ports 610. Input/output devices can include, but are not limited to, a keyboard, a microphone, a pointing and selection device, cameras, video cards, displays, disk 606, network devices 620, and the like. The input/output ports 610 can include but are not limited to, serial ports, parallel ports, and USB ports. The computer 600 may also interact with various virtual devices (not illustrated).

The computer 600 can operate in a network environment and thus may be connected to network devices 620 via the I/O interfaces 618, and/or the I/O ports 610. Through the network devices 620, the computer 600 may interact with a network. Through the network, the computer 600 may be logically connected to remote computers. The networks with which the computer 600 may interact include, but are not limited to, a local area network (LAN), a wide area network (WAN), and other networks. The network devices 620 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), Zigbee (IEEE 802.15.4) and the like. Similarly, the network devices 620 can connect to WAN technologies including, but not limited to, point to point links, circuit switching networks like integrated services digital networks (ISDN), packet switching networks, and digital subscriber lines (DSL). While individual network types are described, it is to be appreciated that communications via, over, and/or through a network may include combinations and mixtures of communications.

Figure 7:
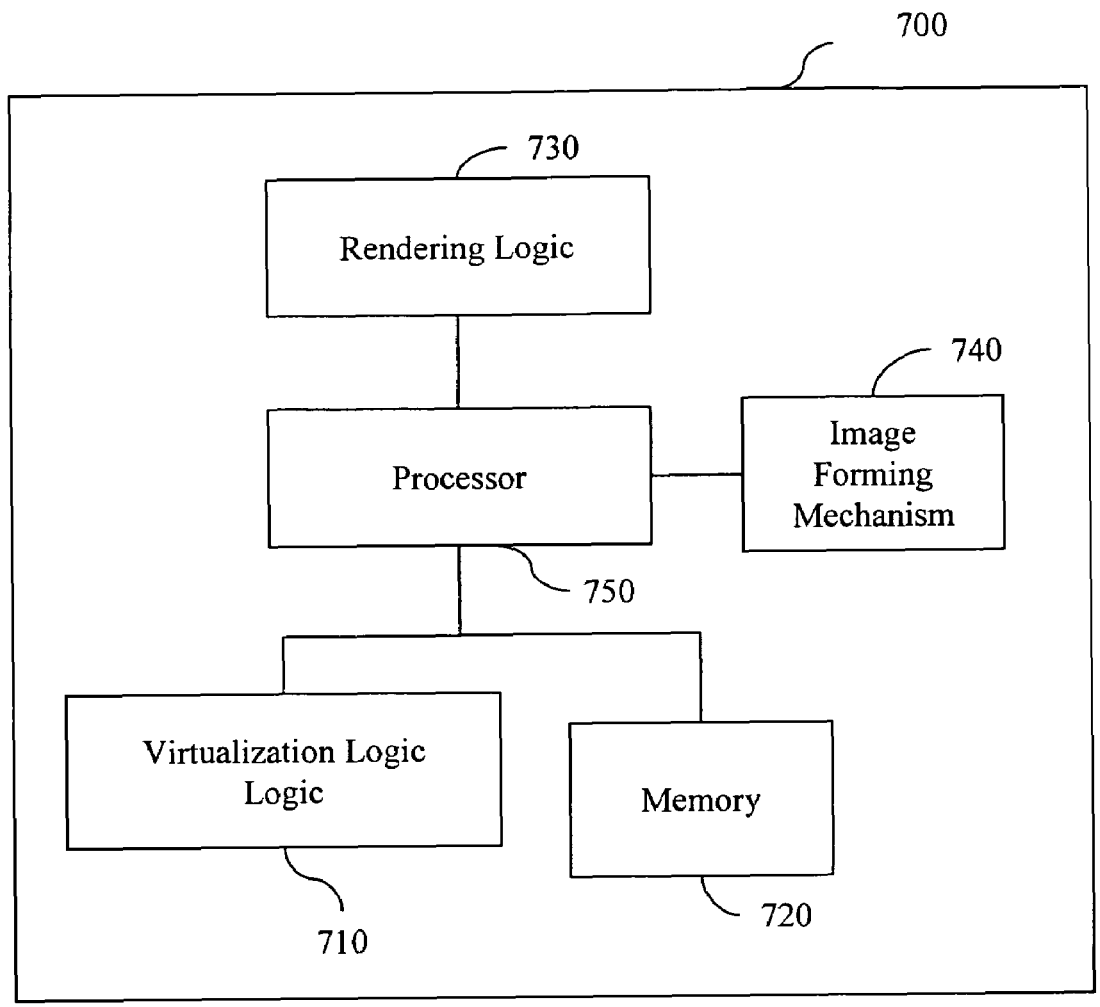
FIG. 7 illustrates an example image forming device in which example systems and methods illustrated herein may operate.

FIG. 7 illustrates an example image forming device 700 that includes an external address trap logic 710 similar to the example systems described herein. The external address trap logic 710 may be configured to perform executable methods like those described herein. The external address trap logic 710 may be permanently and/or removably attached to the image forming device 700.

The image forming device 700 may receive print data to be rendered. Thus, image forming device 700 may also include a memory 720 configured to store print data or to be used more generally for image processing. The image forming device 700 may also include a rendering logic 730 configured to generate a printer-ready image from print data. Rendering varies based on the format of the data involved and the type of imaging device. In general, the rendering logic 730 converts high-level data into a graphical image for display or printing (e.g., the print-ready image). For example, one form is ray-tracing that takes a mathematical model of a three-dimensional object or scene and converts it into a bitmap image. Another example is the process of converting HTML into an image for display/printing. It is to be appreciated that the image forming device 700 may receive printer-ready data that does not need to be rendered and thus the rendering logic 730 may not appear in some image forming devices.

The image forming device 700 may also include an image forming mechanism 740 configured to generate an image onto print media from the print-ready image. The image forming mechanism 740 may vary based on the type of the imaging device 700 and may include a laser imaging mechanism, other toner-based imaging mechanisms, an ink jet mechanism, digital imaging mechanism, or other imaging reproduction engine. A processor 750 may be included that is implemented with logic to control the operation of the image-forming device 700. In one example, the processor 750 includes logic that is capable of executing Java instructions. Other components of the image forming device 700 are not described herein but may include media handling and storage mechanisms, sensors, controllers, and other components involved in the imaging process.

Figure 8:
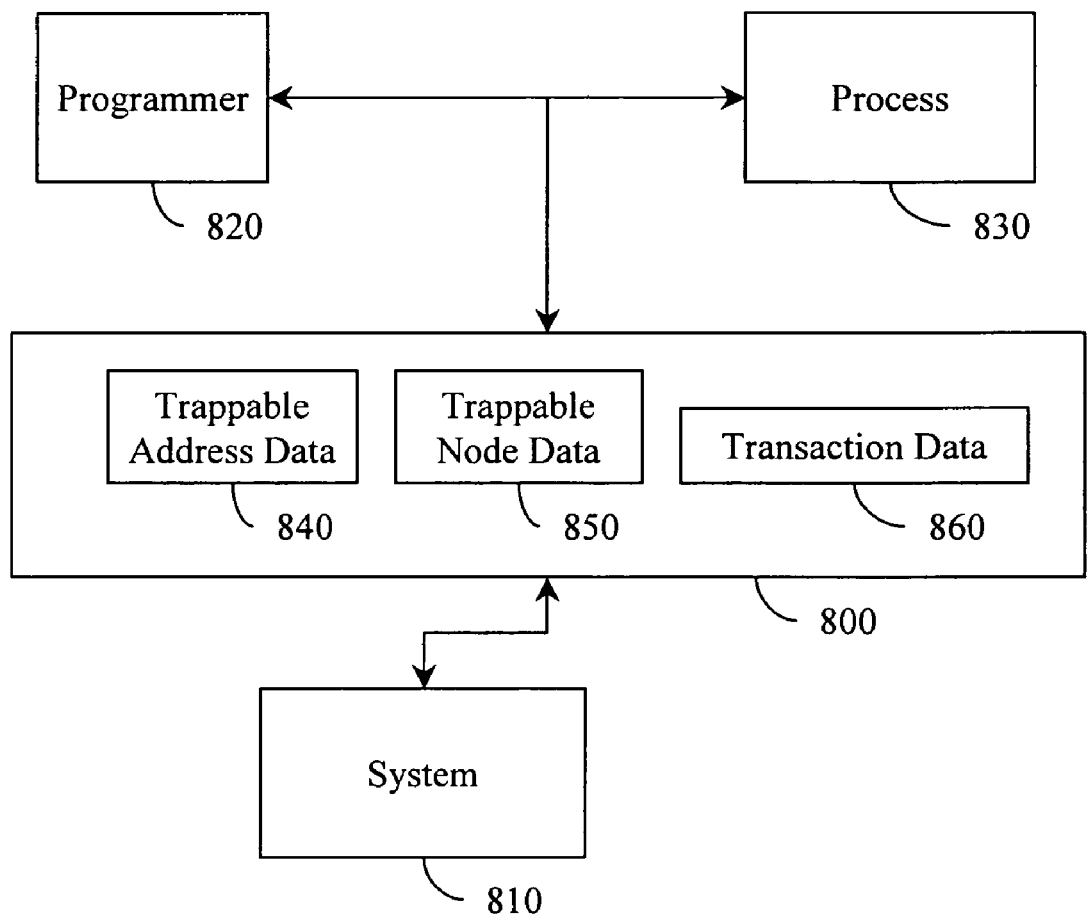
FIG. 8 illustrates an example application programming interface (API).

Referring now to FIG. 8, an application programming interface (API) 800 is illustrated providing access to a system 810 for supporting off-chip hardware-based virtualization for a processor. The API 800 can be employed, for example, by a programmer 820 and/or a process 830 to gain access to processing performed by the system 810. For example, a programmer 820 can write a program to access the system 810 (e.g., invoke its operation, monitor its operation, control its operation) where writing the program is facilitated by the presence of the API 800. Rather than programmer 820 having to understand the internals of the system 810, the programmer 820 merely has to learn the interface to the system 810. This facilitates encapsulating the functionality of the system 810 while exposing that functionality.

Similarly, the API 800 can be employed to provide data values to the system 810 and/or retrieve data values from the system 810. For example, a process 830 that processes virtual memory accesses can provide trappable address data to the system 810 via the API 800 by, for example, using a call provided in the API 800. Thus, in one example of the API 800, a set of application programming interfaces can be stored on a computer-readable medium. The interfaces can be employed by a programmer, computer component, logic, and so on, to gain access to a system 810 for externally trapping a transaction associated with a virtual device. The interfaces can include, but are not limited to, a first interface 840 that communicates a trappable address data, a second interface 850 that communicates a trappable node data, and a third interface 860 that communicates a transaction data, where the transaction data may be identified as a trappable transaction based on trappable address data and/or trappable node data associated with the transaction.

Figure 9:
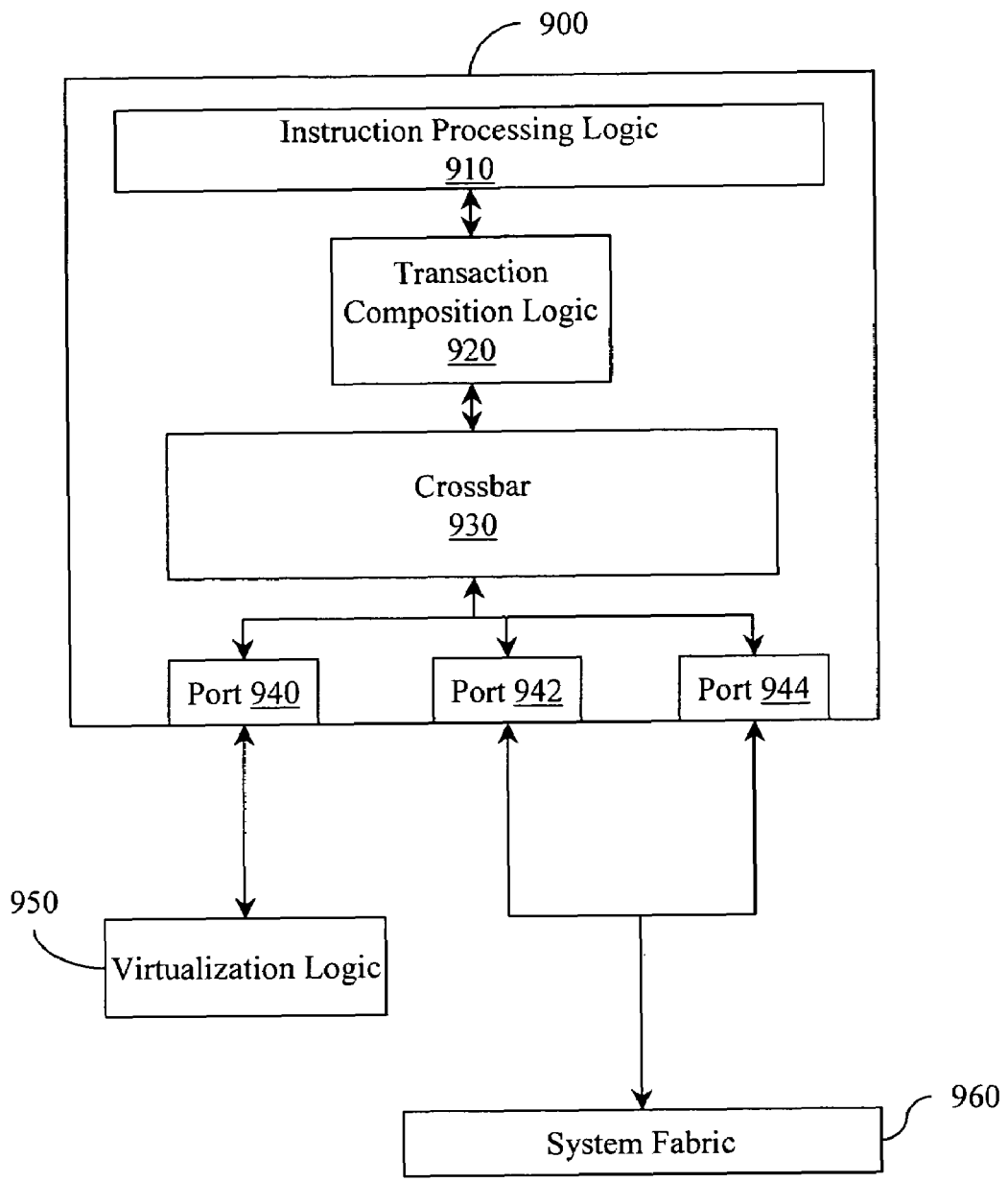
FIG. 9 illustrates an example processor operably connected to an external virtualization logic.

FIG. 9 illustrates an example processor 900 operably connected to an external virtualization logic 950. The processor 900 may be configured to produce a memory transaction. Processor 900 may include an instruction processing logic 910 that is configured to process computer executable instructions. The instruction processing logic 910 may perform like a traditional instruction processing logic in a central processing unit. Processor 900 may also include a transaction composition logic 920 that is configured to produce a memory accessing transaction related to processing a computer executable instruction. Additionally, processor 900 may include ports (e.g., 940, 942, 944) through which the memory accessing transaction can be provided. At least one of the ports (e.g., 940) may be dedicated as a virtualization logic communication port. While three ports are illustrated, it is to be appreciated that a greater and/or lesser number of ports may be employed. Processor 900 may also include a crossbar 930 configured to operably connect the transaction composition logic 920 to the ports.

Like the processors illustrated in FIG. 1 and FIG. 2, processor 900 does not include internal virtualization support. For example, processor 900 is not configured with internal support for trapping addresses associated with a virtual device. However, processor 900 does include the transaction composition logic 920, crossbar 930, and ports 940 through 944, which are arranged in a manner that facilitates selecting through which ports various transactions are provided. In one example, all transactions associated with a certain address range may be provided through a first port (e.g., 940) while all other transactions not associated with the address range are provided through other ports (e.g., 942, 944). Thus, the first port may be employed to deliver transactions associated with a certain address range to a virtualization logic 950. If the address range is configured in a certain manner, then only transactions intended for a virtual device will be provided to virtualization logic 950.

Virtualization logic 950 may be located external to processor 900 and may be operably connected to processor 900 by a virtualization logic communication port (e.g., 940). The virtualization logic 950 may include a data store configured to store a memory reading transaction and/or a memory writing transaction. The virtualization logic 950 may also include a transaction logic that is configured to selectively provide a signal to the processor 900 in response to the virtualization logic 950 receiving a memory accessing transaction. The signal may take various forms. In one example, the virtualization logic 950 may provide an MPT to the processor 900 in response to receiving a memory transaction. In another example, the virtualization logic 950 may provide an NMI to the processor 900 in response to receiving a memory transaction.

The processor 900 may be configured to call a handler process in response to receiving the signal (e.g., MPT) from the virtualization logic 950. The handler process may in turn be configured to execute, in order, memory read and memory write transactions stored in the data store in the virtualization logic 950. As described above, transactions intended for a virtual device may be provided through port 940 to the virtualization logic 950. Other transactions may be provided through other ports (e.g., 942, 944) to other locations like a system fabric 960 operably connected to the processor 900.

Figure 10:
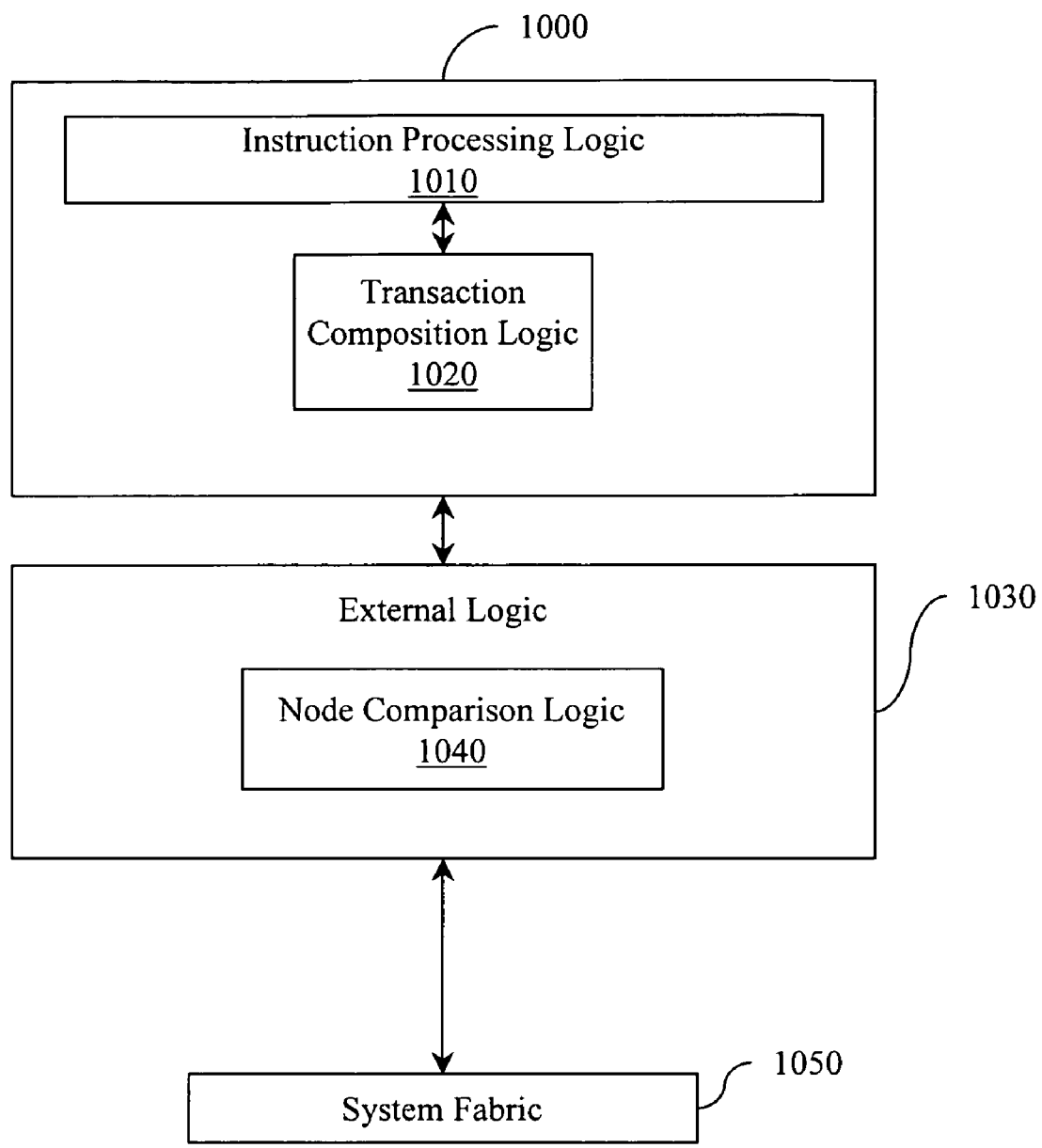
FIG. 10 illustrates another example processor operably connected to an external virtualization logic.

FIG. 10 illustrates a processor 1000 that is operably connected to an external logic 1030. Processor 1000 is configured to produce a memory transaction but has no internal support for trapping addresses associated with a virtual device. Thus external logic 1030 may provide virtualization support for processor 1000.

Processor 1000 includes an instruction processing logic 1010 that is configured to process computer executable instructions. Processor 1000 also includes a transaction composition logic 1020 that is configured to produce a memory accessing transaction related to processing a computer executable instruction. For example, a computer executable instruction may require a value from a memory location. Thus, transaction composition logic 1020 may produce a transaction to retrieve that value from memory. The transaction composition logic 1020 may be configured to map memory accessing transactions associated with a first address range to a first node and to map memory accessing transactions associated with addresses outside the first address range to another node(s). Mapping a transaction to a node may include associating node address data with a transaction. Thus, a relationship between a node address and a virtual device may be established by transaction composition logic 1020.

Logic 1030 may be located external to processor 1000 and may be operably connected to processor 1000. Logic 1030 may include a data store (not illustrated) that is configured to store a trappable node address. Logic 1030 may also include a node comparison logic 1040 that is configured to receive a memory accessing transaction from the processor 1000. The node comparison logic 1040 may selectively produce a trap when a received transaction references the trappable node address.

Logic 1030 may also include a second data store (not illustrated) that is configured to store data associated with a memory reading and/or writing transaction for which the node comparison logic 1040 produced a trap. The logic 1030 may also include a transaction logic (not illustrated) that is configured to selectively provide a signal to the processor 1000 in response to the node comparison logic 1040 producing the trap. In one example, the transaction logic in external logic 1030 may be configured to provide an MPT transaction to processor 1000 in response to the node comparison logic 1040 producing a trap. In another example, the transaction logic may be configured to provide an NMI to the processor 1000 in response to the node comparison logic 1040 producing a trap. Like other logics described herein, the external logic 1030 may produce a trap for some transactions (e.g., those associated with a virtual device) while allowing other transactions to flow through to other destinations. Thus, in one example, a system fabric 1050 may be the destination for some transactions not trapped by the external logic 1030.

While example systems, methods, and so on, have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. A virtualization logic embodied on a computer-readable medium and configured to be operably connected to a processor configured without internal virtualization logic, comprising:

a first data store configured to store a trappable memory address associated with a virtual device;

an address comparison logic configured to receive a memory transaction from the processor and to selectively produce a trap when the memory transaction references the trappable memory address;
where the address comparison logic being configured to provide a posted response to the processor in response to receiving a memory write transaction from the processor; and
the address comparison logic being configured to provide a read defer response to the processor in response to receiving a memory read transaction from the processor;
a second data store configured to store data associated with a memory read transaction for which the address comparison logic produced a trap;
a third data store configured to store data associated with a memory write transaction for which the address comparison logic produced a trap; and
a transaction logic configured to selectively provide a signal to the processor in response to the address comparison logic producing the trap where the signal causes the processor to invoke executable code for interacting with the virtual device.

2. The virtualization logic of claim 1, the trappable memory address being associated with a virtual input/output device.

3. The virtualization logic of claim 2, the transaction logic being configured to provide a management to processor transaction (MPT) to the processor in response to the address comparison logic producing a trap.

4. The virtualization logic of claim 3, the processor being configured to call a handler process in response to receiving the MPT from the virtualization logic, the handler process being configured to execute, in order, memory transactions stored in one or more of, the second data store and the third data store.

5. The virtualization logic of claim 3, the processor being controllable to enter one of a secure state and an insecure state, and where a protected address range may not be accessed by the processor when the processor is in the insecure state.

6. The virtualization logic of claim 5, where the processor is controlled to enter the secure state in response to receiving the MPT.

7. The virtualization logic of claim 5, where a register associated with one or more of, controlling and configuring the virtualization logic is located in the virtualization logic and has an address in the protected address range.

8. The virtualization logic of claim 1, further configured to prevent the processor from stalling on the memory transaction when the trap is produced by sending an acknowledgement to the processor for the memory transaction.

9. The virtualization logic of claim 1, the transaction logic being configured to provide a non-maskable interrupt to the processor in response to the address comparison logic producing a trap.

10. The virtualization logic of claim 1, the virtualization logic being located in a cell controller.

11. The virtualization logic of claim 1, where the trappable memory address is written to the first data store by a boot firmware associated with one or more of, booting the processor, and initializing an operating system associated with the processor.

12. A virtualization logic configured to be operably connected to a memory transaction producing processor configured without internal virtualization logic, comprising:

a first data store configured to store a trappable memory address associated with a virtual input/output device, where the trappable memory address is written to the first data store by a boot firmware associated with one or more of booting the processor and initializing an operating system associated with the processor;
an address comparison logic configured to receive a memory transaction from the processor, to selectively produce a trap when the memory transaction references the trappable memory address, to provide a read defer response to the processor in response to receiving a memory read transaction from the processor, and to provide a posted response to the processor in response to receiving a memory write transaction from the processor;
a second data store configured to store data associated with a memory read transaction for which the address comparison logic produced a trap;
a third data store configured to store data associated with a memory write transaction for which the address comparison logic produced a trap; and
a transaction logic configured to selectively provide a management to processor transaction (MPT) to the processor in response to the address comparison logic producing a trap;
the processor being configured to call a handler process in response to receiving the MPT from the virtualization logic, the handler process being configured to execute, in order, memory transactions stored in one or more of the second data store and the third data store.

13. A system, comprising:
a processor configured to produce a memory transaction, the processor not having internal support for trapping addresses associated with a virtual device, the processor comprising:
an instruction processing logic configured to process computer executable instructions;
a transaction composition logic configured to produce a memory accessing transaction related to processing a computer executable instruction;
two or more ports through which the memory accessing transaction can be provided, where at least one of the ports may be dedicated as a virtualization logic communication port; and
a crossbar configured to operably connect the transaction composition logic to the two or more ports; and
a virtualization logic located external to the processor, the virtualization logic being operably connected to the processor by the virtualization logic communication port, the virtualization logic comprising:
a data store configured to store one or more of, data associated with a memory reading transaction and data associated with a memory writing transaction; and
a transaction logic configured to selectively provide a signal to the processor in response to the virtualization logic receiving a memory accessing transaction.

14. The system of claim 13, the virtualization logic being configured to provide a management to processor transaction (MPT) to the processor in response to receiving a memory transaction.

15. The system of claim 14, the processor being configured to call a handler process in response to receiving the MPT from the virtualization logic, the handler process being configured to execute, in order, memory read and memory write transactions stored in the data store.

16. The system of claim 13, the virtualization logic being configured to provide a non-maskable interrupt to the processor in response to receiving a memory transaction.

17. The system of claim 13, comprising:
a system fabric operably connected to the processor, the system fabric being configured to receive the memory accessing transaction.

18. A system comprising:
a processor configured to produce a memory transaction, the processor not having internal support for trapping addresses associated with a virtual device, the processor comprising:
an instruction processing logic configured to process computer executable instructions; and
a transaction composition logic configured to produce a memory accessing transaction related to processing a computer executable instruction, where the transaction composition logic is configured to map memory accessing transactions associated with a first address range to a first node; and
a virtualization logic located external to the processor, the virtualization logic being operably connected to the processor, the virtualization logic comprising:
a first data store configured to store a trappable node address;
a node comparison logic configured to receive a memory accessing transaction from the processor and to selectively produce a trap when the transaction references the trappable node address;
a second data store configured to store one or more of, data associated with a memory reading transaction for which the node comparison logic produced a trap and data associated with a memory writing transaction for which the node comparison logic produced a trap; and
a transaction logic configured to selectively provide a signal to the processor in response to the node comparison logic producing the trap.

19. The system of claim 18, the transaction logic being configured to provide a management to processor transaction (MPT) to the processor in response to the node comparison logic producing a trap.

20. The system of claim 18, the transaction logic being configured to provide a non-maskable interrupt to the processor in response to the node comparison logic producing a trap.

21. The system of claim 18, comprising:
a system fabric operably connected to the processor, the system fabric being configured to receive the memory accessing transaction.

22. A virtualization logic located external to a processor, where the processor is configured to produce a memory transaction, the processor is configured without internal support for trapping addresses associated with a virtual device, and where the processor comprises:
an instruction processing logic configured to process computer executable instructions;
a transaction composition logic configured to produce a memory accessing transaction related to processing a computer executable instruction;
two or more ports through which the memory accessing transaction can be provided, where at least one of the ports may be dedicated as a virtualization logic communication port; and
a crossbar configured to operably connect the transaction composition logic to the two or more ports;
the virtualization logic comprising:
a data store configured to store one or more of, data associated with a memory reading transaction and data associated with a memory writing transaction; and
a transaction logic configured to selectively provide a signal to the processor in response to the virtualization logic receiving a memory accessing transaction, where the virtualization logic is operably connected to the processor by the virtualization logic communication port.

23. A virtualization logic located external to a processor, where the processor is configured to produce a memory transaction, the processor is configured without internal support for trapping addresses associated with a virtual device, and where the processor comprises:
an instruction processing logic configured to process computer executable instructions; and
a transaction composition logic configured to produce a memory accessing transaction related to processing a computer executable instruction, where the transaction composition logic is configured to map memory accessing transactions associated with a first address range to a first node;
the virtualization logic comprising:
a first data store configured to store a trappable node address;
a node comparison logic configured to receive a memory accessing transaction from the processor and to selectively produce a trap when the transaction references the trappable node address;
a second data store configured to store one or more of, data associated with a memory reading transaction for which the node comparison logic produced a trap and data associated with a memory writing transaction for which the node comparison logic produced a trap; and
a transaction logic configured to selectively provide a signal to the processor in response to the node comparison logic producing the trap, and where
the virtualization logic is operably connected to the processor.

* * * * *